United States Patent [19]

Mildenstein et al.

[11] Patent Number: 5,239,817
[45] Date of Patent: Aug. 31, 1993

[54] FIRE ZONE VENTILATION SHUT-OFF SYSTEM

[75] Inventors: Stephen E. Mildenstein, W. Chester, Ohio; Joseph R. Marban, Richland, Miss.

[73] Assignee: General Electric Company, Cincinnati, Ohio

[21] Appl. No.: 787,336

[22] Filed: Nov. 4, 1991

[51] Int. Cl.⁵ .................................................. F02C 7/25
[52] U.S. Cl. .............................. 60/39.091; 60/39.83; 244/129.2
[58] Field of Search ............... 60/39.091, 39.31, 39.33, 60/39.83; 244/129.2

[56] References Cited

U.S. PATENT DOCUMENTS

| | | |
|---|---|---|
| 2,340,006 | 1/1944 | MacGregor . |
| 2,952,125 | 9/1960 | Brunton ........................... 60/39.091 |
| 4,097,184 | 6/1978 | Hansson . |
| 4,441,314 | 4/1984 | Fitton ............................... 60/39.091 |
| 4,535,797 | 8/1985 | Rosaen . |
| 4,603,708 | 8/1986 | Altmann . |
| 4,825,644 | 5/1989 | Bubello et al. ................... 60/39.091 |
| 5,054,281 | 10/1991 | Muthch ............................ 60/39.83 |

Primary Examiner—Louis J. Casaregola
Attorney, Agent, or Firm—Jerome C. Squillaro; John R. Rafter

[57] ABSTRACT

A fire emergency ventilation shut-off system for an aircraft having at least one fire zone, includes at least one shut-off valve having an element disposed in an inlet of the fire zone, the valve element being movable between open and closed positions and being normally in the open position to permit air to enter the compartment, and a fuel actuator, operatively coupled to the valve stem, for moving the valve element to the closed position in response to a reduction in engine fuel pressure.

19 Claims, 4 Drawing Sheets

FIRE ZONE VENTILATION SHUT-OFF SYSTEM

BACKGROUND OF THE INVENTION

Field of the Invention

The present invention relates generally to gas turbine engines used for aircraft propulsion and, more specifically, to a shut-off system capable of starving air from a fire zone during a fire emergency.

Description of the Related Art

Aircraft jet engines have one or more fire zones that are usually ventilated. For example, if the engine is a fan-jet type, the fan nacelle defines a fan discharge passageway between an inner surface thereof and an outer surface of a core engine nacelle that surrounds the core engine. A core compartment is defined as a space between an outer surface of the core engine and an inner surface of the core engine nacelle. The core compartment is a fire zone and may be ventilated, either to help cool the core engine area or to prevent the collection of combustible fumes in the core compartment. Ventilation air, for a fan-jet type engine as described above, comes from the fan discharge. If the engine is not a fan-jet type, the core compartment is ventilated by other sources by air, such as from the engine compressor.

To extinguish a fire in the engine nacelle fire zone, a certain concentration of fire extinguishing agent, such as Halon, is required for a specified time. The concentration of agent and time at concentration are set by various aircraft certifying agencies such as the Federal Aviation Administration (FAA).

Recently, there has been a trend towards requiring higher agent concentrations for longer periods of time. These requirements can be met by providing larger, and thus heavier, fire extinguishing bottles that provide greater quantities of agent, but this approach is inherently disadvantageous because of the increased weight and space associated with larger bottles.

An alterative approach would be to provide less ventilation air in the compartment that can dilute the fire extinguishing agent. One effort to restrict air flow is described in U.S. Pat. No. 4,441,314, issued to Fitton, wherein an active tip clearance control system is combined with a nacelle ventilation system through the use of a valve having an element positioned to either block air to both systems, or to channel air to one of the two systems.

The aforementioned U.S. patent does not address the problem of valve actuation, particularly for engines where compartment ventilation is the normal condition, and ventilation air is supplied through fail-open valves. Valves which are actuated by actuators receiving control signals through electrical wires are susceptible to failure since a fire could damage the wires before the valves are actuated. Moreover, once a fire emergency is acknowledged, standard operating procedures mandate that electricity be cut off from the engine. Without electricity to provide control signals, the fail-open feature of the valves would make shut-down of ventilation impossible.

SUMMARY OF THE INVENTION

An object of the present invention is therefore to provide a fire zone ventilation shut-off system that is capable of restricting air flow to a fire zone and thereby enhance the fire extinguishing capability of a given quantity of fire extinguishing material.

Another object of the present invention is to provide a fire zone ventilation system which is capable of being retrofitted onto existing ventilation valves with a minimum of modification.

Still another object of the present invention is to provide a fire zone ventilation system which is relatively inexpensive and easy to install.

Another object of the present invention is to provide a fire zone ventilation system which operates passively without the need for wired controls or fire signals or other electrical components.

These and other objects of the invention are met by providing a fire zone ventilation shut-off system for an aircraft engine having a core engine compartment which includes at least one shut-off valve having an element disposed in an inlet of the compartment, the valve element being movable between open and closed positions and being normally in the open position to permit air to enter the compartment and an actuator including a drive element operatively coupled to the valve element, the drive element being driven in one direction by a drive force imparted by pressurized engine fuel and in an opposite direction by a return force imparted by a return spring so that when the return force exceeds the drive force, the drive element moves the valve element to the closed position.

These and other features and advantages of the present invention will become more apparent with reference to the following detailed description and drawings.

DETAILED DESCRIPTION OF THE PREFERRED EMBODIMENTS

Figure 1:
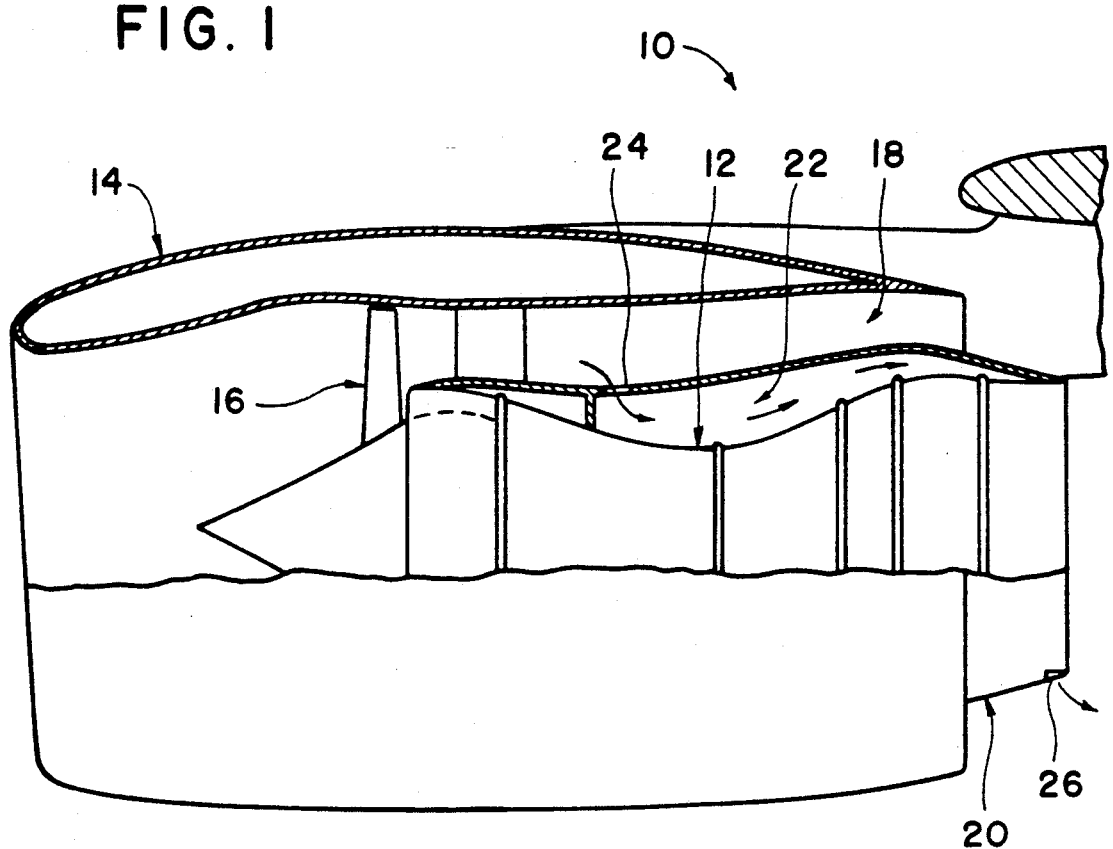
FIG. 1 is a side elevational view, partly cut-away and partly in section, of an aircraft engine capable of employing the fire zone ventilation shut-off system according to the present invention.

Referring now to FIG. 1, an aircraft engine is generally referred to by the numeral 10 and includes a core engine 12 supported in a fan nacelle 14. The illustrated engine 10 is of the fan-jet type and thus includes rotatable fan blades 16. A fan discharge 18 is defined as an annular passageway between an inner surface of the nacelle 14 and an outer surface of a core engine nacelle 20.

A core compartment 22 is defined as the space between the inner surface of the core engine nacelle 20 and the outer surface of the core engine 12. The compartment, which is a fire zone, typically includes at least one inlet 24 through which ventilation air is introduced. The source of ventilation air is the fan discharge, as shown by the directional arrows. However, it is understood that if the engine is not a fan-jet type, the source can come from other areas, such as the compressor or stream air used for ventilation purposes.

The inlet 24 is part of the nacelle ventilation system by which cooling air flows into the compartment 22 and out through appropriate outlets, such as outlet 26. Ventilation air in the compartment may come from other sources including accessory-related items, such as the integrated drive generator (IDG) cooling system (not shown).

Figure 2:
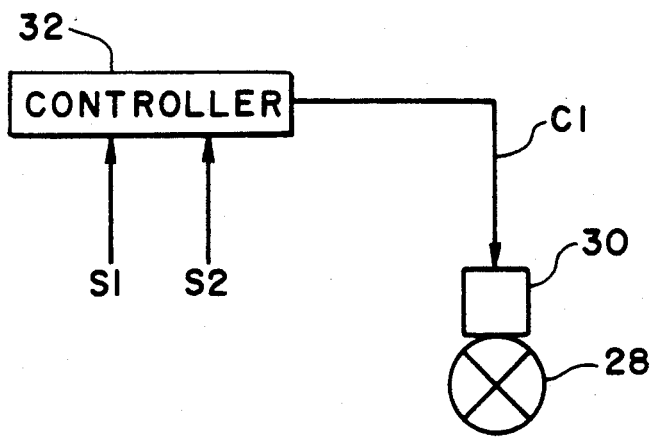
FIG. 2 is a schematic view of a core compartment cooling system capable of being modified to include the ventilation shut-off system of the present invention.

Whether from the ventilation system or the IDG cooling system, the air flow for each is regulated by a valve that fails in the open position. As shown in FIG. 2, a valve 28, coupled to the inlet 24 of the compartment 22, is actuated by an actuator 30 in response to a control signal C1 output by a controller 32. The controller 32 is programmed so that, based on operational parameter signals S1, S2, etc., the valve element of the valve 28 will be positioned to correspond to programmed optimum positions. For example, when greater thrust is required, it is desirable to prevent air from being bled from the fan discharge and thus the valve 28 is closed. This type of valve control is currently being used in various engines manufactured by the Assignee of the present invention, General Electric Corporation, including Model Nos. CF6-80C2, CF6-80E1, and GE90.

Figure 3:
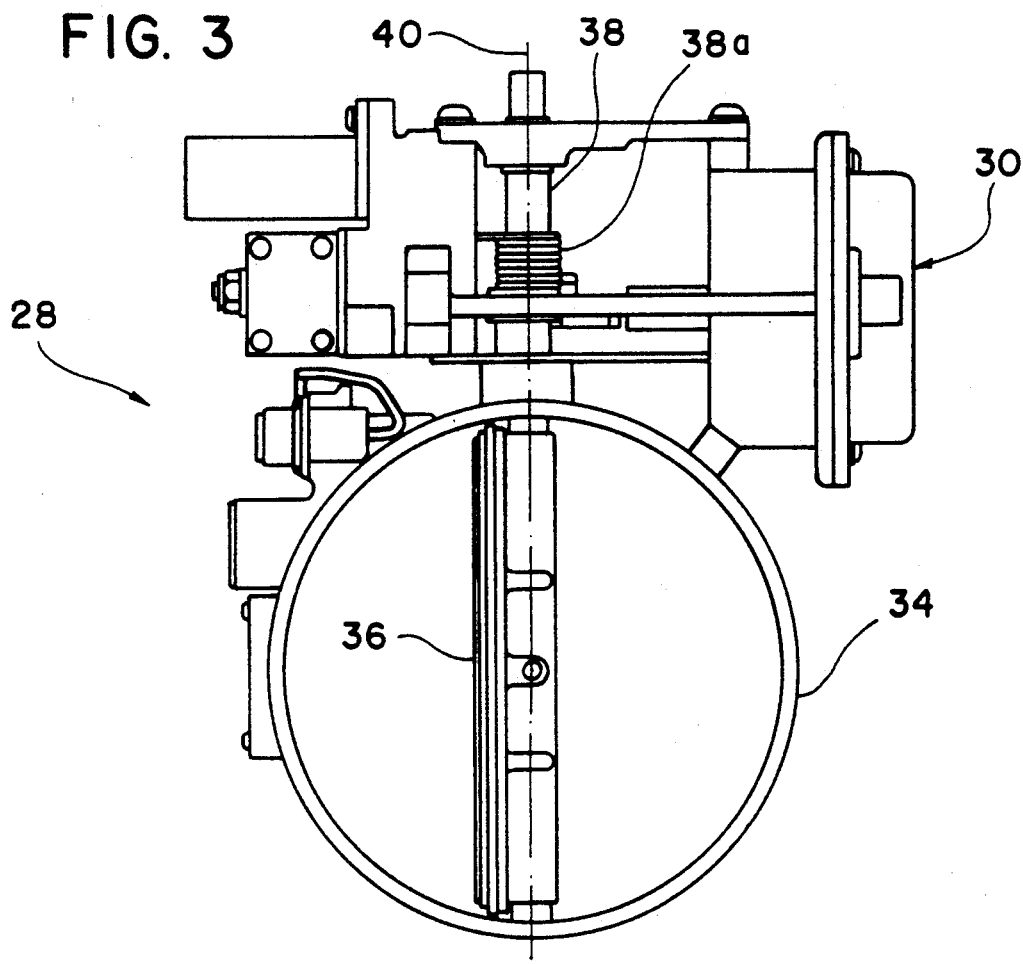
FIG. 3 is an end view of a valve and actuator assembly used in the nacelle ventilation system according to the present invention.
Figure 4:
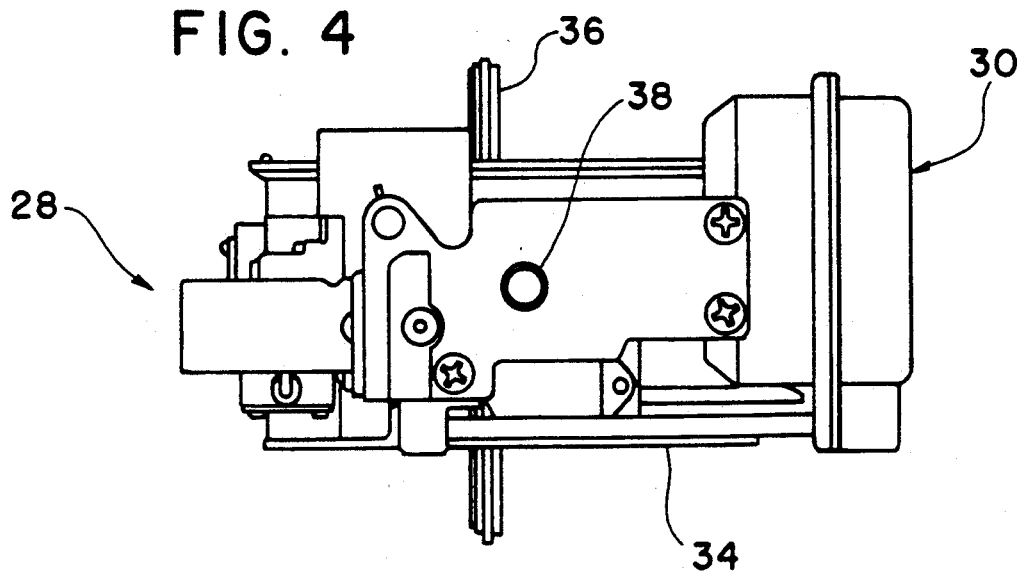
FIG. 4 is a top view of the valve and actuator of FIG. 3.

A more detailed description of the standard valve 28 and actuator 30 follows with reference to FIGS. 3 and 4. The valve 28 which includes a body and a butterfly-type valve element 36 mounted on a stem 38 for rotation about a vertical axis 40. The valve element 36 is normally in the open position, as illustrated in FIGS. 3 and 4, and is designed to fail-open, meaning that if power is cut from the actuator 30, the valve element 36 will remain open. The actuator 30 is a known pneumatically driven actuator which causes the stem 38 to rotate.

If it is determined that a fire is burning in the engine, normal operating procedures require that all electricity and fuel be shut-off from the engine by pulling a "fire handle". When this happens, the valve 28 remain in the open position, since it is designed to fail open, and thus these ventilation and cooling valves are not available to shut-off ventilation air to the nacelle compartment.

Figure 5:
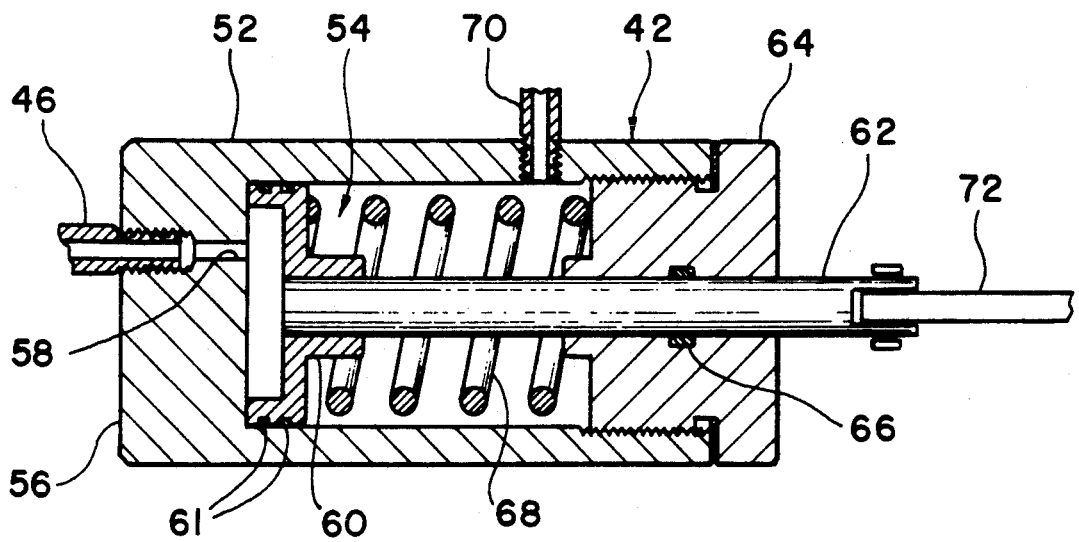
FIG. 5 is a vertical sectional view of a fuel actuator of the nacelle ventilation system according to the present invention.
Figure 6:
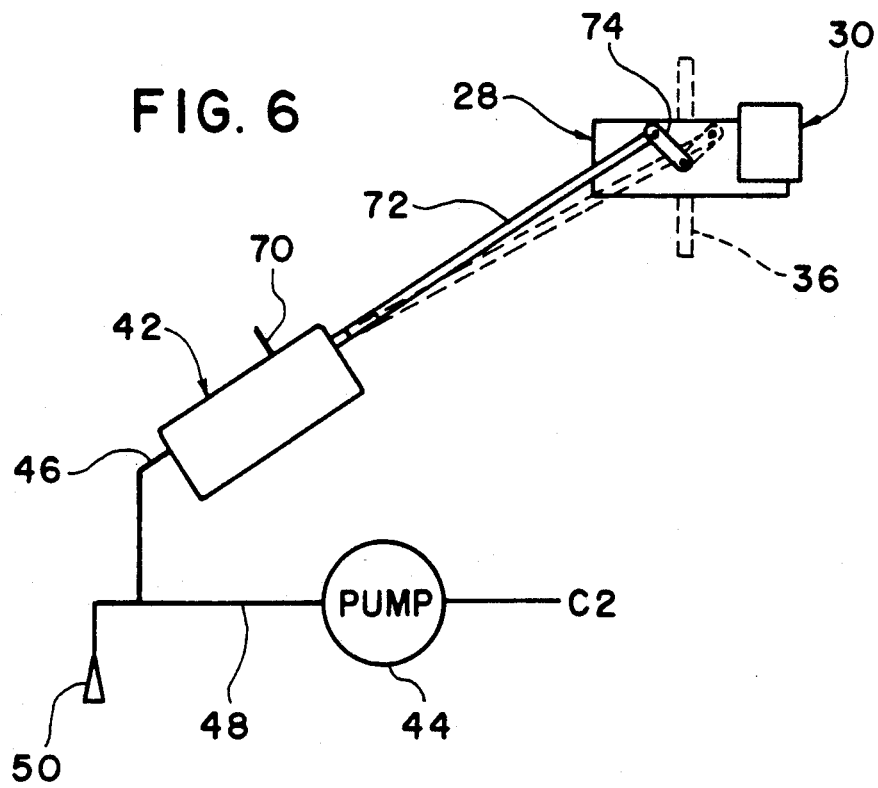
FIG. 6 is a schematic view of the nacelle ventilation system according to the present invention.

The present invention provides a system which uses the valves already in place to shut-off ventilation air by overriding the fail-open feature of the valve. This is accomplished by providing a separate, independently operated actuator. As illustrated in FIGS. 5 and 6, a fuel actuator 42 receives pressurized fuel from a fuel pump 44. A feed line 46 may run directly from the pump 44, or as illustrated in FIG. 6, run as a branch off the combustor nozzle feed line 48 which feeds fuel to the nozzles 50.

The fuel actuator 42 includes a main body 52 which is cylindrically shaped and has a cylindrical bore 54 and an integrally formed closed end 56. Preferably, the body 52 and end 56 are made of stainless steel. The closed end 56 has a channel 58 formed therethrough which communicates pressurized fuel from line 46 to the pressure face of a piston 60. The piston 60 is mounted on the end of a cylindrical drive element 62, which is preferably a steel rod. A guide block 64 is fixedly mounted in the open end of the body 52 and has an axial bore which slidably receives the drive element 62. Block 64 is also preferably made of stainless steel. Sealing elements, such as seal 66, can be used to prevent leakage of fuel.

A spring 68 is disposed in the bore 54 between the rear surface of the piston 60 and the rear surface of the guide block 64 so as to bias the drive element 62 in a retracted position as illustrated in FIG. 5. When pressurized fuel enters the bore 54 on the pressure face side of the piston 60, the piston 60 is driven towards the block 64. Air from within the bore 54 is expelled through a vent 70 as the piston moves towards the block 64. The vent 70 is also used to detect leakage of fuel from the pressurized face of piston 60 past the seals 61 by observing fuel in the vent line 70. It is understood that the travel of the piston is limited so that the piston does not pass the vent 70, since this would present a fuel leak and artificial pressure drop.

The spring 68 compresses as the drive element 62 and piston 60 move outwardly, and develops a spring return force so that when fuel pressure is eliminated or reduced to a threshold level, the outward movement is reversed and the piston and drive element 62 return to their original position. Fuel pressure is reduced when a fire emergency event occurs by shutting down the fuel supply by a throttle command signal C2, or by other known and suitable means.

Figure 7:
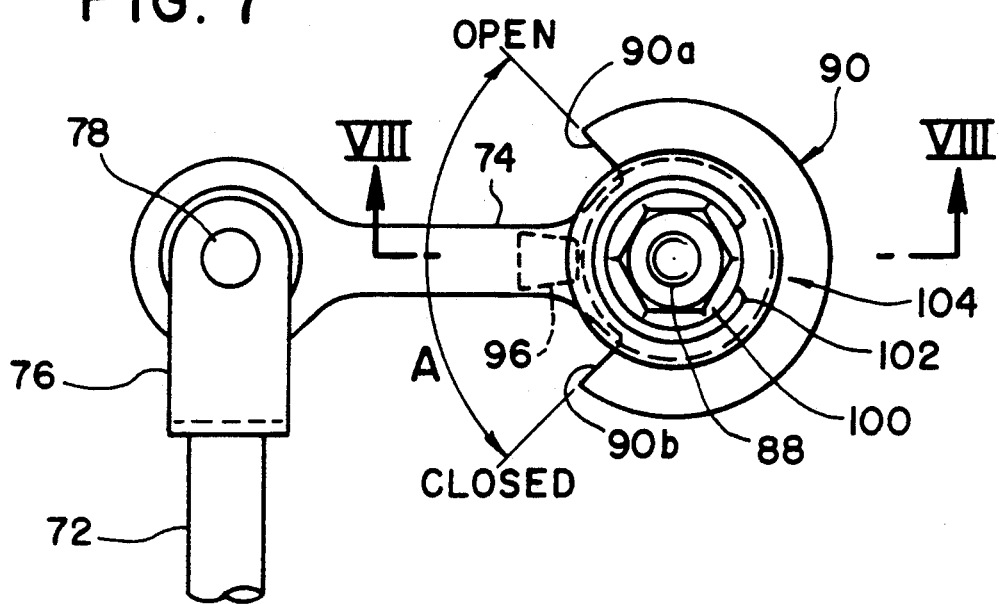
FIG. 7 is an enlarged top view of an override lever coupled to a valve stem of the valve shown in FIGS. 3 and 4.
Figure 8:
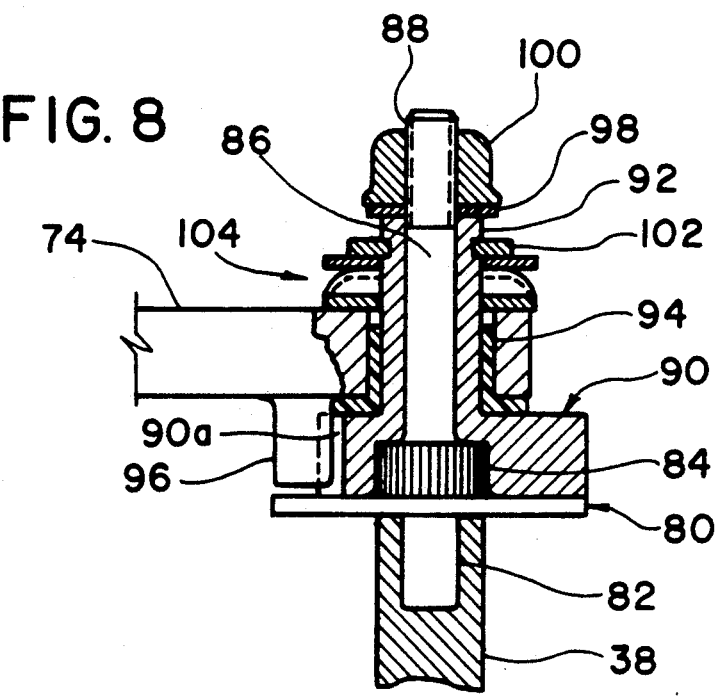
FIG. 8 is a sectional view taken along lines VIII—VIII of FIG. 6.

The drive element 62 is connected to the valve element through a flexible connector 72, such as a flexible rod or flexible cable, which is pivotally connected to one end of a lever 74, which is connected to the valve stem at its opposite end. In FIG. 6, the lever 74 is shown in the valve-closed position, and in broken lines in the valve-open position. Details of the coupling between the valve 28 and the actuator 42 will now be explained with reference to FIGS. 7 and 8.

A clevis 76 or similar attachment is provided on one end of the flexible connector 72 and forms the pivotal connection to one end of the lever 74 with a pin 78. The other end of the lever 74 is connected to the valve stem 38 through an adapter 80 having a square drive 82, an externally splined portion 84, a shaft portion 86, and a threaded end portion 88. Since the square drive 82 locks with the stem 38, the adapter 80 rotates with the stem 38 when the stem is caused to rotate by the pneumatic actuator 30 in a known fashion.

A cam 90 has an axial bore through an upstanding sleeve portion 92. An internally splined socket receives the shaft portion 86 and externally splined portion 84 of the adapter 80, so that the cam 90 rotates with the adapter 80. The lever 74 is rotatably mounted on the sleeve portion 92 of the cam 90 through a non-metallic, press-fit bushing 94. A tab 96 is formed on the lever 74 and cooperates with cam surfaces 90a and 90b to rotate the valve stem 38. The adapter assembly further includes a washer 98, a nut 100, an E-clip 102, and a wave spring 104.

The arrow "A" defines a 90° travel arc for the valve element, and the cam is shown in a valve element midstroke position. It can be seen that the valve element can be actuated by actuator 30 through its full range of movement without moving the lever 74. Thus, if the controller signals the actuator 30 to close the valve, for reasons other than a fire emergency, the flexible connector 72 will not be forced to retract into the fuel actuator 42. If the cam 90 is rotated to a position corresponding to the full-open position and a fire emergency is detected, tab 96 will abut cam surface 90b and thus, counter-clockwise rotation of the lever 74 (as viewed in FIG. 7) will cause the valve element to close.

As described above, the lever 74 overrides the fail-open feature of the valve 28 in the event of a fire emergency, while permitting normal operation of the valve, including complete closure of the valve element, during non-fire emergency situations.

The present invention may thus provide a fuel actuator for existing valves which control ventilation air in the core engine compartment. If no valves are in place, the present invention could entail placing a valve in an inlet and providing the valve with a fuel actuator. In other words, the present invention does not require the presence of the separately controlled actuator 30. Without the actuator 30, a simplified valve structure could be employed which would not need the adapter assembly described above.

One advantage to using a fuel actuator is that the valve element will be closed automatically, meaning that once fuel pressure decreases to a certain level the valve element closes without the need for electrical control signals.

The actuator 30 includes means for causing the valve to fail-open. Since pneumatic and other pressurized fluid actuators are well known, a detailed explanation of their functions need not be provided, as they are familiar to those skilled in the art. Side valves are commercially available from Janitrol, Inc. of Columbus, Ohio (now believed to be known as Grimes Aerospace). The fail-open feature could be provided by a spring 38a (FIG. 3) which develops a spring return force when the stem rotates away from the open position.

The cam override feature of the present invention could use an existing lever on top of the stem 38, as some valves are provided with such levers for manual override lock-out functions. In that case, the cam would be the existing lever which would be energized by the lever 74.

Finally, the cam 90 need only have surface 90b for closing the valve; the additional surface 90a allows for re-opening of the valve after fuel pressure is re-introduced to the fuel actuator.

What is claimed is:

1. A fire emergency ventilation shut-off system for an aircraft having a fire zone, comprising:
    at least one shut-off valve having an element disposed in an inlet of the fire zone, the valve element being reversibly movable between open and closed positions and being normally in the open position to permit air to enter the fire zone; and
    first actuator means, operatively coupled to a valve stem, for moving the valve element to the closed position in response to a reduction in engine fuel pressure.

2. A fire emergency ventilation shut-off system according to claim 1, wherein the first actuator means comprises a first actuator including a drive element operatively coupled to the valve element, the drive element being driven by pressurized engine fuel in one direction, the actuator including a return spring for biasing the drive element in an opposite direction so that when a force exerted on the drive element by the return spring exceeds a force exerted by the fluid pressure, the drive element moves the valve element to the closed position.

3. A fire emergency Ventilation shut-off system according to claim 2, wherein the valve includes a valve stem on which the valve element is fixedly mounted, and the first actuator includes a connector having one end connected to the drive element, and a lever mounted on the valve stem, an opposite end of the connector being connected to the lever.

4. A fire emergency ventilation shut-off system according to claim 3, wherein the first actuator includes a body having first and second ends and a cylindrical bore, a piston mounted on the drive element, a channel extending through the first end for communicating fuel to the cylindrical bore, and a guide block disposed at the second end and slidably receiving the drive element, the spring being disposed between the piston and the guide block.

5. A fire emergency ventilation shut-off system according to claim 3, further comprising an adapter assembly, connected to the valve stem for mounting the lever.

6. A fire emergency ventilation shut-off system according to claim 5, wherein the adapter assembly includes a cam having at least one cam surface and being rotatable with the valve stem, and the lever includes a tab which engages the at least one cam surface to impart rotation in the cam and thus the stem.

7. A fire emergency Ventilation shut-off system according to claim 1, further comprising second actuator means, operatively coupled to the valve stem, for moving the valve element between open and closed positions independently of the first actuator means.

8. A fire emergency ventilation shut-off system according to claim 7, wherein the second actuator means includes fail-open means for positioning the valve element in the open position upon failure of the second actuator means.

9. A fire emergency ventilation shut-off system according to claim 8, wherein the first actuator means overrides the fail-open means.

10. A fire emergency ventilation shut-off system according to claim 7, wherein the second actuator means comprises a pneumatic actuator.

11. A fire emergency ventilation shut-off system according to claim 3, wherein the connector is a flexible rod.

12. A fire emergency ventilation shut-off, system according to claim 3, wherein the connector is a flexible cable.

13. A fire emergency ventilation shut-off system for an aircraft having at least one fire zone, comprising:
    at least one shut-off valve having an element disposed in, an ,inlet of the fire zone, the valve element being reversibly movable between open and closed positions and being normally in the open position to permit air to enter the fire zone; and
    first actuator means, operatively coupled to a valve stem, for moving the valve element to the closed position in response to a reduction in engine fuel pressure; and
    second actuator means, operatively coupled to the valve stem, for moving the valve element between open and closed positions independently of the first actuator means.

14. A fire emergency ventilation shut-off system according to claim 13, wherein the second actuator means includes fail-open means for positioning the valve element in the open position upon failure of the second actuator means.

15. A fire emergency ventilation shut-off system according to claim 14, wherein the first actuator means comprises a first actuator including a drive, element operatively coupled to the valve element, the drive element being driven by pressurized engine fuel in one direction, the actuator including a return spring for biasing the drive element in an opposite direction so that when a force exerted on the drive element by the return spring exceeds a force exerted by the fluid pressure, the drive element moves the valve element to the closed position.

16. A fire emergency ventilation shut-off system according to claim 15, wherein the valve includes a valve stem on which the valve element is pivotally mounted, and the first actuator includes a connector having one end connected to the drive element, and a lever mounted on the valve stem, an opposite end of the connector being connected to the lever.

17. A fire emergency ventilation shut-off system according to claim 16, wherein the first actuator includes a body having first and second ends and a cylindrical bore, a piston mounted on the drive element, a channel extending through the first end for communicating fuel to the cylindrical bore, and a guide block disposed at the second end and slidably receiving the drive element, the spring being disposed between the piston and the guide block.

18. A fire emergency ventilation shut-off system according to claim 17, further comprising an adapter assembly, connected to the valve stem for mounting the lever.

19. A fire emergency ventilation shut-off system according to claim 18, wherein the adapter assembly includes a cam having at least one cam surface and being rotatable with the valve stem, and the lever includes a tab which engages the at least one cam surface to impart rotation in the cam and thus the stem.

* * * * *